Patented Sept. 6, 1949

2,481,273

UNITED STATES PATENT OFFICE 2,481,273

ISOOLEFIN POLYMERIZATION CATALYZED BY FRIEDEL-CRAFTS DOUBLE SALTS

David W. Young, Roselle, N. J., assignor to Standard Oil Development Company, a corporation of Delaware No Drawing. Application January 1, 1943, Serial No. 471,077

15 Claims. (Cl. 260—85.3)

This invention relates to polymerization catalysts, relates particularly to catalyst solutions for the polymerization of olefinic material at low temperatures, and relates particularly to a Friedel-Crafts halide complex which is soluble in hydrocarbons and retains the solubility at low temperatures.

It has been found possible to polymerize isobutylene, or isobutylene and diolefins in admixture at temperatures ranging from 0° C. down to approximately −160° C. by the application thereto of Friedel-Crafts catalysts such as boron trifluoride or aluminum chloride in solution. However, boron trifluoride as a catalyst is readily poisoned by impurities, and aluminum chloride, while it is soluble in a limited number of substances such as the lower alkyl halides, carbon disulfide and the like, has such a low solubility that only relatively low concentrations can be prepared, and in addition these solvents are relatively expensive and in some instances are undesirable in the olefinic material.

According to the present invention, Friedel-Crafts catalyst complexes, such as complexes of aluminum bromide with aluminyl bromide (AlOBr) are prepared and dissolved in hydrocarbon solvents such as liquid propane in which their solubility is relatively quite high. In such solutions, their catalytic potency is very high and they yield excellent olefinic polymers of very high molecular weights. In addition by proper control of the proportions of the normal salt and the aluminyl salt, it is possible to exercise a very substantial control of the speed of polymerization without sacrifice of the quality of the polymer.

Thus an object of the invention is to dissolve Friedel-Crafts complexes in hydrocarbon solvents to yield catalyst liquids capable of polymerizing olefinic materials to high molecular weights. Other objects and details of the invention will be apparent from the following description.

In practicing the invention, a double salt is prepared of a Friedel-Crafts halide such as aluminum bromide with an oxy halide of a Friedel-Crafts metal such as titanium oxy chloride. Representative catalysts, according to the invention, are listed as follows:

InOBr.AlBr₃           TiOCl₂.AlBr₂I
TiOF₂.AlBr₃           AlBr₃.AlOBr
TiOBr₂.AlBr₃          AlBr₂Cl.AlOBr
TiBr_y.AlOBr          AlCl₃.AlOI
TiF₄.AlOBr            AlI₃.AlOBr
TiOCl₂.Al₂Br₅Cl       BBr₃.AlOBr
TiOCl₂.AlBr₃          TiOCl₂.AlBr₃.AlI₃

In preparing these substances, a Friedel-Crafts oxy halide is prepared by treatment of the chloride with small or limited amounts of cold water, then the oxy halide and a second halide are mixed and heated to fusion to yield a homogeneous double salt and to drive off the hydrogen halide produced. A convenient method for hydrating the chlorides is to mix the Friedel-Crafts metal halide with an inactive salt containing a substantial amount of water of crystallization. Magnesium sulfate with water of crystallization is a good material. The reactions involved are well shown by the following equations:

$$TiCl_4 + H_2O \text{ (cold)} \longrightarrow TiOCl_2 + 2HCl$$

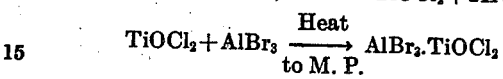
$$TiOCl_2 + AlBr_3 \xrightarrow[\text{to M. P.}]{\text{Heat}} AlBr_2.TiOCl_2$$

This yields a double salt of a Friedel-Crafts bromide with the oxy chloride of a second Friedel-Crafts metal. Alternatively a single Friedel-Crafts metal and halide may be used as in the following equations:

$$AlBr_3 + H_2O \longrightarrow AlBr_2OH + HBr \text{ (Low temp.)}$$

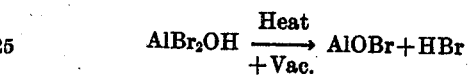
$$AlBr_2OH \xrightarrow[+\text{Vac.}]{\text{Heat}} AlOBr + HBr$$

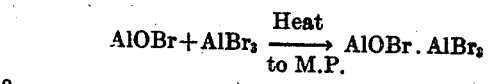
$$AlOBr + AlBr_3 \xrightarrow[\text{to M.P.}]{\text{Heat}} AlOBr.AlBr_3$$

In either of these reactions, the Friedel-Crafts halide is mixed with the powdered salt hydrate at approximately 20° C. in as fine a state of division as possible and the mixture is allowed to stand for some hours. The resulting metal oxy halide may then be separated from the residuum of inert salt by treatment with a solvent such as a low boiling hydrocarbon or the like. Alternatively, however, the separation need not be effected, but the second portion of Friedel-Crafts halide may be added to the mixture of inert salt hydrate and Friedel-Crafts halide and the material heated under vacuum to the melting point of the double salt to drive off the hydrogen halide which is evolved by the partial hydration. Thereafter the double oxy halide and normal halide may be removed from the inert salt by treatment with a solvent such as a low boiling hydrocarbon.

These complex salts of Friedel-Crafts metals and halides show a relatively very high solubility in such solvents as liquid ethane, propane, butane, pentane, hexane, heptane, kerosene, benzene, toluene, chloroform, carbon disulfide, ether, alcohol and carbon sulfo chloride and the like. The solubility characteristics are well indicated by the solubility of the complex of aluminum bromide and aluminyl bromide 4(AlBr₃).(AlOBr) in normal butane which is found to be 9.7 grams per 100 milliliters at the boiling point of normal butane (approximately 0.60° C.); and 0.6 grams per 100 milliliters at −78° C.

For the purposes of this invention, substantially any of the Friedel-Crafts catalyst substances as disclosed by N. O. Calloway in his article on the "Friedel-Crafts Synthesis" printed in the issue of "Chemical Reviews" published for the American Chemical Society at Baltimore in 1935, in volume XVII, number 3, the article beginning on page 327, the list being particularly well shown on page 325, may be used, and either one metal or two metals or more than two metals may be used, depending upon the particular catalyst characteristics desired. Likewise, a single halide may be used or several different halides may be used.

This type of catalyst is particularly desirable for olefinic polymerizations generally. It is particularly adapted to the low temperature polymerization of isobutylene, to yield high molecular weight polymers having molecular weights between 1000 and 500,000 (as determined by the Staudinger method). For this purpose the isobutylene or other olefin having from 3 to 6 or 7 carbon atoms per molecule is cooled either by an external refrigerant, around the polymerization reactor, or by an internal refrigerant such as admixed liquid ethylene or liquid ethane or liquid methane or liquid propane or the like, or a non-diluent refrigerant may be used such as solid carbon dioxide or liquid carbon dioxide dissolved in the reaction mixture; the amount present being sufficient to cool the material to the equilibrium boiling point of the mixture and maintain that temperature in spite of the heat of polymerization. From 100 parts of refrigerant per 100 parts of isobutylene to 700 to 800 parts of refrigerant per 100 parts of isoolefin is a convenient range. The resulting polymer may have a molecular weight within the range between 1000 and 500,000 and may have an iodine number within the range of a small fraction of 1 to about 10, the iodine number being inversely proportional to the molecular weight, and when molecular weights exceed about 10,000 the material is substantially saturated chemically and behaves practically as other fully saturated hydrocarbons do.

Alternatively, the catalyst is valuable for the polymerization of olefinic mixtures such as mixtures of an isoolefin, preferably isobutylene with a diolefin such as butadiene or other diolefins having from 4 to 12 or 14 carbon atoms per molecule. Such a polymerization mixture preferably contains a major proportion of the isoolefin and a minor proportion of the diolefin, although valuable and worthwhile products are obtained from any proportion having above 5 or 10% of the isoolefin present. The catalyst is not limited to the polymerization of isoolefins or isoolefin-containing mixtures, nor is it limited to low temperature polymerizations since it is applicable to many other polymerizable substances such as styrene, alpha methyl styrene, butadiene, isoprene, chloroprene and benzyl chloride.

In the polymerization of these materials, the catalyst solution is prepared containing from 0.05% of the double salt above described to saturation values which may range up to 15% or even higher, depending upon the solvent and the double salt. When working with the catalyst in solution form, the amount of catalyst solution used may vary from 0.1 part per 100 parts of polymerizable olefins to approximately 75 parts per 100 parts of polymerizable olefins, depending upon the temperature, the concentration of the catalyst solution and the nature of the polymerizable olefin. However, as these catalysts are hydrocarbon soluble, I do not wish to be limited to the use of these materials in solution form, as tests have proven that valuable polymers can be produced when traces of the solid powdered catalyst are added directly to a hydrocarbon monomer at temperatures from about +20° to −160°.

EXAMPLE I

A mixture was prepared consisting of 100 parts of liquid isobutylene with 50 parts of liquid ethane and the container was chilled in a bath of liquid ethane to approximately −86° C. Simultaneously, a catalyst was prepared as above described in the form of a double salt of aluminyl iodide with aluminum iodo bromide $(AlBr_2I)_2 \cdot AlOI$ dissolved in liquid propane, the solution containing approximately 1.7 percent of the solid catalyst. The polymerization reaction occurred within a time of a few seconds and a polyisobutylene having a molecular weight of approximately 22,000 was obtained, approximately 80% of the isobutylene being polymerized.

The catalyst used above was prepared by pulverizing one gram molecular weight of aluminum metal to a powder sufficiently small to pass through a tin mesh sieve. This pulverized metal was introduced into a dried vitreous reactor (such as is described by Archibald in his text on "The Preparation of Pure Inorganic Substances," pp. 164–171, published by John Wiley and Sons in 1932). The reactor and contents were then thoroughly dried by heating in a current of dry nitrogen prepared by passing the nitrogen through a drying system containing phosphorous pentoxide and strong sulfuric acid. When the system was dried and while still filled with dry nitrogen, the current of nitrogen was interrupted and one gram atomic weight of dry iodine was added at room temperature to the pulverized aluminum. Reaction began in a few seconds and the temperature of the mixture rose to about 80° C. At this stage 2 gram atomic weights of pure liquid bromine were introduced. The dry halogen reacted with the aluminum rapidly at about 80° and the temperature rose to about 200° C. Because of the high heat of reaction, the temperature was regulated by cooling water on the exterior of the reactor to prevent too violent combustion. As the reaction passed towards completion, the heat moderated, and the reactor was then held for several hours at about 80° C. Analysis of the finished material indicated that it was pure aluminum bromo iodide, $AlBr_2I$.

Simultaneously, aluminyl iodide was prepared by reacting a similar quantity of one gram molecular weight of powdered aluminum with 3 gram molecular weights of pure iodine (as outlined in Archibald's text "The Preparation of Pure Inorganic Substances," pp. 164–171). One molecular weight of aluminum tri-iodide was then treated for 24 hours at room temperature with one molecular weight of water obtained from the water of crystallization of crystallized magnesium sulfate, $MgSO_4 \cdot 7H_2O$. The aluminyl bromide was then separated from the magnesium sulfate by solution in normal butane. The butane was then boiled off and the aluminyl bromide heated under vacuum to a temperature between 80° and 90° C. for about an hour, the vacuum being approximately 50 millimeters of mercury, to remove the hydrogen iodide. The following reactions occurred:

$$AlI_3 + HOH \longrightarrow AlI_2OH + HI$$

$$AlI_2OH \xrightarrow[\text{Vacuum}]{\text{Heat}} AlOI + HI$$

The aluminum bromo iodide and the aluminyl iodide were then mixed in powdered form in the ratio of 2 molecular weights of aluminum bromo iodide with one molecular weight of aluminyl iodide and heated to 102° C for five minutes. The mixture fused to yield the desired double salt which upon analysis was found to contain the following components:

| | Percent |
|---|---|
| Al | 10.15 |
| I | 47.60 |
| Br | 39.90 |
| O | 2.02 |
| H | 0.0 |

EXAMPLE II

A mixture was prepared consisting of 100 parts of isobutylene with 25 parts of liquid ethane and the reactor was placed in a bath of liquid ethane, the temperature being reduced thereby approximately —86° C. Simultaneously a catalyst was prepared in the form of a double salt of aluminyl bromide with aluminum bromide ($4AlBr_3.AlOBr$) by a procedure closely analogous to that described in Example I. Analysis of the finished double salt showed the composition to be as follows:

| | Percent |
|---|---|
| Al | 11.36 |
| Br | 87.40 |
| O | 1.29 |
| H | 0.00 |

Approximately 0.2 part of this aluminyl double salt was dissolved in approximately 10 parts of liquid ethane and the solution was added to the cold isobutylene-containing mixture. The reaction occurred within a fraction of a second to yield a polyisobutylene having a molecular weight of approximately 58,000.

EXAMPLE III

A mixture was prepared consisting of approximately 100 parts of liquid isobutylene with 25 parts of liquid ethane and the container was chilled in a bath of liquid ethane to a temperature of approximately —86° C. Simultaneously a catalyst was prepared by the procedure as above outlined in the form of a double salt of aluminum bromide with titanyl chloride ($4AlBr_3.TiOCl_2$). Approximately 0.2 part of this double salt was dissolved in approximately 10 parts of a 1 to 1 mixture of liquid ethane and liquid propane. The catalyst solution was then added to the cold isobutylene mixture and a polymerization reaction occurred within a fraction of a second to yield a polyisobutylene having a molecular weight of approximately 86,000.

EXAMPLE IV

A mixture of 100 parts of isobutylene with 50 parts of liquid ethane was prepared in a reactor and chilled by a surrounding jacket of liquid ethane to a temperature of approximately —86° C. Simultaneously a double salt catalyst of aluminyl bromide and aluminum bromide $$(4AlBr_3.AlOBr)$$

was prepared and approximately 0.2 part of the solid double salt was dissolved in approximately 10 parts of liquid butane. The finished polymer amounted to approximately 92% by weight of the amount of isobutylene monomer used. This solution was then added to the cold isobutylene mixture and a polymerization reaction occured within a fraction of a second to yield a solid, polyisobutylene having a molecular weight of approximately 100,000. Upon analysis this double salt was found to contain the following components in the proportions indicated:

| | Percent |
|---|---|
| Al | 10.8 |
| Br | 87.9 |
| O | 1.4 |

Yield of product was 92% by weight.

EXAMPLE V

A mixture was prepared consisting of 98 parts of isobutylene with two parts of isoprene and cooled to approximately —78° C. by the addition of powdered solid carbon dioxide to the olefinic mixture. This mixture was polymerized by the addition thereto of approximately 20 parts of a catalyst solution consisting of petroleum ether containing approximately 0.2 parts per hundred of a double salt of aluminum bromide and aluminyl bromide ($AlBr_3.AlOBr$). A polymerization reaction occurred to yield an interpolymer of isobutylene and isoprene having a molecular weight of approximately 25,000. The yield of product was 54% by weight. This material was found to be reactive with sulfur and other curing agents to yield a good natural rubber substitute.

EXAMPLE VI

A series of polymers was prepared utilizing mixtures of isobutylene and isoprene in proportions ranging from 1.45% to 10% of isoprene in the mixture. These mixtures were cooled by an excess of solid carbon dioxide to a temperature of approximately —78° C. Simultaneously, a catalyst was prepared consisting of approximately 1 part of AlOBr with four parts aluminum bromide ($4AlBr_3.AlOBr$) dissolved in butane at the boiling point of butane. The concentration of the catalyst in the butane was 1%. Each of the cold mixtures of isobutylene and isoprene were then polymerized by adding approximately 20 parts of catalyst solution per 100 parts of mixed olefins. The catalyst solution was blown through a small nozzle delivering the catalyst onto the surface of the rapidly stirred olefinic mixture. In these instances the reaction did not start immediately but required from 1 to 5 minutes before it occurred, and continued for time intervals ranging from 30 to 40 minutes. At the close of the polymerization reaction, the reactor contents were dumped into warm water and the solid polymer recovered and dried. The several batches of polymer were then compounded on the open roll mill according to the following recipe:

| | Parts |
|---|---|
| Polymer | 100 |
| Zinc oxide | 5 |
| Stearic acid | 3 |
| Sulfur | 2 |
| Cabot #9 | 50 |
| Tuads | 1 |
| Captax | 0.5 |

The following table shows the character of curing treatment applied to the compounded polymer and the physical properties of the resulting cured polymer:

*Tensile test data*

| Run No. | 1 | 2 | 3 | 4 |
|---|---|---|---|---|
| Isoprene Content, % | 1.45 | 3 | 5 | 10 |
| Cure (Min.) | 40  60 | 30  60 | 30  60 | 10  30  60 |
| Cure (° F.) | 307  307 | 307  307 | 307  307 | 307  307  307 |
| Modulus @ 300% | 775  919 | 663  1,112 | ---  --- | 275  592  670 |
| Tensile | 2,830  2,527 | 2,090  2,250 | 507  313 | 422  706  793 |
| Elongation | 697  697 | 700  550 | 709  948 | 484  380  320 |

*Flexometer data*

| Run No. | 1 | 2 |
|---|---|---|
| Type of Polymer | B1.45 | B3 |
| Stroke (in.) | .125 | .125 |
| Load (lbs./sq. in.) | 148 | 148 |
| Oven Temp., ° C | 100 | 100 |
| Static Compression | 386 | 348 |
| Initial Dynamic Compression | 334 | 283 |
| Dynamic Drift | .146 | .144 |
| Time of Run (Min.) | 30 | 30 |
| Temp. Rise (° C.) | 24.2 | 15.8 |
| Appearance | #2 | #4 |
| Cure (° F.) | 307 | 307 |

*Plasticity data and molecular weight*

| Run No. | 1 | 2 | 3 | 4 |
|---|---|---|---|---|
| Polymer Type | B1.45 | B3 | B5 | B10 |
| Mooney Plast. (212° F.) | 77 | 25 | | |
| Rebound at R. T. (per cent) | 23.4 | | | |
| Williams Plast. (70° F.) | | | 30–6 | 33–5 |
| Molecular Weight | 46,000 | 56,000 | 40,000 | 21,000 |

These results show that a high grade interpolymer was obtained which is an adequate and satisfactory substitute for natural rubber.

EXAMPLE VII

A series of polymers was prepared utilizing mixtures of isobutylene and butadiene in proportions ranging from 3.5% to 5.0% of butadiene in the mixture. These mixtures were cooled by an excess of solid carbon dioxide to the temperature of approximately −78° C. Simultaneously, a catalyst was prepared consisting of 6AlBr$_3$.AlOBr. The analysis of the catalyst is listed

| | Per cent |
|---|---|
| Al | 10.6 |
| Br | 88.5 |
| O | 0.9 |
| H | 0.0 |

Each of the cold mixtures of isobutylene and butadiene was polymerized by adding approximately 25 parts of catalyst solution. The solvent for the catalyst was propane and the concentration of the catalyst in propane was 2.1%. The catalyst solution was blown through a small nozzle delivering the catalyst onto the surface of the rapidly stirred olefinic mixture. After 10 minutes the yield of product was 80 to 90% by weight. The products were washed with water and compounded according to the recipe given in Example VI. The following table shows the character of compounded and cured products:

*Tensile test data*

| Run | 1 | 2 |
|---|---|---|
| Butadiene Content of Feed, per cent | 3.5 | 5 |
| Cure, Min | 60 | 60 |
| Cure, ° F | 307 | 307 |
| Modulus @ 300 per cent | 113 | 685 |
| Tensile | 1,975 | 2,340 |
| Elongation | 900 | 650 |

EXAMPLE VIII

It is found that the proportions of the aluminyl compound to the aluminum compound (or other Friedel-Crafts normal and oxide salt) greatly modified the speed at which the polymerization reaction is caused to occur. A mixture was prepared consisting of 97 parts by weight of isobutylene with 3 parts by weight of isoprene which was cooled to a temperature of approximately −78° C. by an excess of solid carbon dioxide. A series of double salt catalysts was prepared as described in Example I with varying proportions of aluminum bromide and aluminyl bromide. The various salts were found to polymerize the olefinic mixture at different speeds as shown in the following table:

| Catalyst Composition | Polymerization Time | Per cent Yield | Remarks |
|---|---|---|---|
| AlOBr | | | Does not polymerize. |
| AlOBr.AlBr$_3$ | 5 hours | 25 | Very slow reaction. |
| AlOBr.2AlBr$_3$ | 3 hours | 60 | Slightly faster polymerization. |
| AlOBr.3AlBr$_3$ | 2 hours | 80 | Faster polymerization. |
| AlOBr.4AlBr$_3$ | 1 hour | 86 | Moderately rapid polymerization rate. |
| AlOBr.6AlBr$_3$ | ½ hour | 90 | Good polymerization rate. |
| AlBr$_3$ | 10 minutes | 90 | Forms only low molecular weight polymers. |

In the above table, all of the polymers except those produced by aluminum bromide alone have molecular weights well above 25,000 (as determined by the Staudinger method) and the table shows the advantageous control of the speed of reaction obtainable by control of this catalyst. This control is particularly desirable for the polymerization of large quantities of olefinic mixtures in reactors having merely an exterior cooling jacket, since a relatively slow rate of refrigeration will maintain the polymerization temperature at the desired low value, thereby avoiding the necessity of extremely rapid circulation through cooling tubes which is necessary with all of the prior catalysts which produce ultra high speed polymerization reactions. This characteristic is particularly convenient since it avoids the difficulties otherwise encountered by complicated cooling and circulating equipment.

Accordingly, the invention presents a new and useful polymer substance in the form of a solution of a complex Friedel-Crafts substance which is soluble in the lower hydrocarbon liquids at low temperature and in such solutions shows a powerful polymerizing effect upon liquid olefinic material at low temperatures to yield high molecular weight polymers and interpolymers which are extremely valuable.

While there are above disclosed but a limited number of embodiments of the invention, it is possible to produce still other embodiments without departure from the inventive concept herein disclosed and it is therefore desired that only such limitations be imposed upon the appended claims as are stated therein or required by the prior art.

The invention claimed is:

1. The step of interpolymerizing an isoolefin having 4 to 7 carbon atoms per molecule with a diolefin having 4 to 14 carbon atoms per molecule comprising in combination the steps of mixing the olefins, cooling them to a temperature within the range between 0° C. and −160° C., and polymerizing the cold mixture by the addition thereto of a hydrocarbon solution of a double salt composed of a Friedel-Crafts active metal halide and a Friedel-Crafts active metal oxy halide.

2. The step of interpolymerizing an iso-olefin having 4 to 7 carbon atoms per molecule with a diolefin having 4 to 14 carbon atoms per molecule comprising in combination the steps of mixing the olefins, cooling them to a temperature within the range between 0° C. and −160° C., and polymerizing the cold mixture by the addition thereto of a double salt composed of a Friedel-Crafts active metal halide and a Friedel-Crafts active metal oxy halide.

3. The step of interpolymerizing an iso-olefin having 4 to 7 carbon atoms per molecule with a diolefin having 4 to 14 carbon atoms per molecule comprising in combination the steps of mixing the olefins, cooling them to a temperature within the range between 0° C. and −160° C., and polymerizing the cold mixture by the addition thereto of a double salt composed of a Friedel-Crafts active metal halide and a Friedel-Crafts active metal oxy halide in powdered form.

4. The step of interpolymerizing an iso-olefin having 4 to 7 carbon atoms per molecule with a diolefin having 4 to 14 carbon atoms per molecule comprising in combination the steps of mixing the olefins, cooling them to a temperature within the range between 0° C. and −160° C., and polymerizing the cold mixture by the addition thereto of a double salt composed of a Friedel-Crafts active metal halide and a Friedel-Crafts active metal oxy halid in powdered form in the proportion of 0.1% to 2% of the mixed olefins.

5. The step of inter-polymerizing isobutylene with isoprene, comprising in combination the steps of mixing the isobutylene and isoprene, cooling the mixture to a temperature within the range between 0° C. and −160° C., and polymerizing the cold mixture by the addition thereto of a double salt composed of a Friedel-Crafts active metal halide and a Friedel-Crafts active metal oxy halide.

6. Process according to claim 5, in which the catalyst comprises aluminum bromide and aluminyl bromide.

7. In a process for the polymerization of an ethylenic unsaturate hydrocarbon having from 3 to 14 carbon atoms per molecule at a temperature within the range of between 0° C. and −160° C. the step of adding to the unsaturate a catalyst comprising a solution of a double salt composed of a Friedel-Crafts active metal halide and a catalytically active Friedel-Crafts active metal oxy-halide.

8. In a process for the polymerization of an ethylenic unsaturate hydrocarbon having from 3 to 14 carbon atoms per molecule at a temperature within the range of between 0° C. and −160° C. the step of adding to the unsaturate a catalyst comprising a double salt composed of a Friedel-Crafts active metal halide and a catalytically active Friedel-Crafts metal oxy-halide in solution in a hydrocarbon solvent having less than 10 carbon atoms per molecule.

9. In a process for the polymerization of an ethylenic unsaturate hydrocarbon having from 3 to 14 carbon atoms per molecule at a temperature within the range of between 0° C. and −160° C. the step of adding to the unsaturate a catalyst comprising a double salt of an aluminum halide and an aluminyl halide.

10. In a process for the polymerization of an ethylenic unsaturate hydrocarbon having from 3 to 14 carbon atoms per molecule at a temperature within the range of between 0° C. and −160° C. the step of adding to the unsaturate a catalyst comprising a double salt of an aluminum halide and an aluminyl halide in solution in a hydrocarbon solvent having less than 10 carbon atoms per molecule.

11. In a process for the polymerization of an ethylenic unsaturate hydrocarbon having from 3 to 14 carbon atoms per molecule at a temperature within the range of between 0° C. and −160° C. the step of adding to the unsaturate a catalyst comprising a double salt of an aluminum bromide and aluminyl bromide.

12. In a process for the polymerization of an ethylenic unsaturate hydrocarbon having from 3 to 14 carbon atoms per molecule at a temperature within the range of between 0° C. and −160° C. the step of adding to the unsaturate a catalyst comprising a double salt of an aluminum bromide and aluminyl bromide in solution in a hydrocarbon solvent having less than six carbon atoms per molecule.

13. In a process for the polymerization of an isoolefin having 4 to 7 carbon atoms per molecule at a temperature within the range of 0° C. to −160° C., the improvement comprising conducting the polymerization in the presence of a catalyst containing a double salt of aluminum bromide and aluminyl bromide in solution in a hydrocarbon solvent having less than 10 carbon atoms per molecule.

14. In a process for the polymerization of an isoolefin having 4 to 7 carbon atoms per molecule at a temperature within the range of 0° C. to −160° C., the improvement comprising conducting the polymerization in the presence of a catalyst containing a double salt of alumium bromide and titanyl chloride.

15. The step of interpolymerizing an isoolefin, having 4 to 7 carbon atoms per molecule with a diolefin having 4 to 14 carbon atoms per molecule, comprising in combination the steps of mixing the olefins, cooling them to a temperature within the range between 0° C. and −160° C. and polymerizing the cold mixture by the addition thereto of a double salt composed of aluminum bromide and aluminyl bromide.

DAVID W. YOUNG.

REFERENCES CITED

The following references are of record in the file of this patent:

UNITED STATES PATENTS

| Number | Name | Date |
|---|---|---|
| 1,671,517 | Edeleanu | May 29, 1928 |
| 2,220,930 | Kraus | Nov. 12, 1940 |

OTHER REFERENCES

Thomas, "Anhydrous Aluminum Chloride In Organic Chemistry," Reinhold (1941), page 169.